United States Patent
Aziz et al.

(10) Patent No.: US 11,208,970 B2
(45) Date of Patent: Dec. 28, 2021

(54) AFT CASCADE RING DESIGN CONCEPT

(71) Applicant: ROHR, INC., Chula Vista, CA (US)

(72) Inventors: Peter W. Aziz, San Diego, CA (US); Andrew S. Gurney, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 494 days.

(21) Appl. No.: 16/022,407

(22) Filed: Jun. 28, 2018

(65) Prior Publication Data

US 2020/0003153 A1     Jan. 2, 2020

(51) Int. Cl.
*F02K 1/72*     (2006.01)
*F02K 1/62*     (2006.01)

(52) U.S. Cl.
CPC ............... *F02K 1/625* (2013.01); *F02K 1/72* (2013.01)

(58) Field of Classification Search
CPC ..... F02K 1/54; F02K 1/56; F02K 1/62; F02K 1/625; F02K 1/70; F02K 1/72
See application file for complete search history.

(56) References Cited

U.S. PATENT DOCUMENTS

| | | | |
|---|---|---|---|
| 2,897,533 A * | 8/1959 | Bull ................... B60R 16/0222 16/2.1 |
| 3,285,551 A * | 11/1966 | Tschanz .................. F16C 1/262 248/56 |
| 4,564,160 A * | 1/1986 | Vermilye .................. F02K 1/76 244/11 OB |
| 4,778,110 A * | 10/1988 | Sankey .................... F02K 1/605 239/265.29 |
| 5,228,641 A * | 7/1993 | Remlaoui ................. F02K 1/72 244/11 OB |
| 6,546,715 B1 * | 4/2003 | Blevins ................... F02K 1/566 239/265.29 |
| 8,109,466 B2 | 2/2012 | Aten et al. |
| 8,727,275 B2 * | 5/2014 | Aten ........................ F02K 1/72 244/11 OB |
| 9,034,453 B2 * | 5/2015 | Harasse ................ B64C 1/1446 428/137 |
| 9,086,034 B2 * | 7/2015 | Aten ........................ F02K 1/72 |
| 9,518,534 B2 * | 12/2016 | Kusel ....................... F02K 1/72 |
| 9,797,271 B2 * | 10/2017 | Brown .................. B64D 29/08 |
| 9,895,840 B2 * | 2/2018 | Bartel ................... B29C 66/634 |
| 9,903,313 B2 * | 2/2018 | Aten ........................ F02K 1/72 |
| 9,976,696 B2 * | 5/2018 | Gormley ................ F16H 25/20 |
| 10,040,563 B1 * | 8/2018 | Pinto ........................ F02K 1/09 |
| 10,161,358 B2 * | 12/2018 | Suciu ........................ F02K 1/52 |
| 10,208,708 B2 * | 2/2019 | Gormley ................ F02K 1/763 |

(Continued)

FOREIGN PATENT DOCUMENTS

EP     2581593     4/2013

OTHER PUBLICATIONS

European Patent Office, European Search Report dated Nov. 14, 2019 in Application No. 19172087.9.

*Primary Examiner* — Michael H Wang
(74) *Attorney, Agent, or Firm* — Snell & Wilmer L.L.P.

(57) ABSTRACT

An aft cascade ring includes a first ring portion having a first arc shape and defining a first portion first lug. The aft cascade ring further includes a second ring portion having a second arc shape and defining a second portion first lug, the second ring portion being coupled to the first ring portion such that the first portion first lug and the second portion first lug are aligned.

17 Claims, 10 Drawing Sheets

(56) References Cited

U.S. PATENT DOCUMENTS

| | | | | |
|---|---|---|---|---|
| 10,473,057 B2* | 11/2019 | Aten | ................ | F02K 1/56 |
| 2006/0277895 A1* | 12/2006 | Thornock | ................ | F02K 1/64 |
| | | | | 60/226.2 |
| 2009/0314887 A1* | 12/2009 | Aten | ................ | F02K 1/625 |
| | | | | 244/11 OB |
| 2010/0229528 A1* | 9/2010 | Ramlaoui | ................ | F02K 1/30 |
| | | | | 60/226.2 |
| 2017/0298869 A1* | 10/2017 | Crawford | ................ | F02K 1/70 |

* cited by examiner

AFT CASCADE RING DESIGN CONCEPT

FIELD

The present disclosure relates to thrust reversers for aircraft propulsion systems and, more particularly, to aft cascade rings for use with cascade arrays of thrust reverse systems.

BACKGROUND

Gas turbine engine systems for modern aircraft often include a thrust reverser incorporated into a nacelle. The thrust reverser may redirect the flow of air through the nacelle in order to apply a reverse thrust to the aircraft. One style of thrust reverser includes a translating sleeve. The translating sleeve may translate aft to deploy blocker doors into the bypass air duct of a nacelle. The blocker doors may redirect air in the bypass air duct outward though a series of cascades which then turn the air forward, producing reverse thrust. The cascades may extend from a torque box to an aft cascade ring. The aft cascade ring may provide support for the series of cascades.

SUMMARY

Disclosed herein is an aft cascade ring. The aft cascade ring includes a first ring portion having a first arc shape and defining a first portion first lug. The aft cascade ring further includes a second ring portion having a second arc shape and defining a second portion first lug, the second ring portion being coupled to the first ring portion such that the first portion first lug and the second portion first lug are aligned.

In any of the foregoing embodiments, the first ring portion further defines a first portion second lug; the second ring portion further defines a second portion second lug; and the first portion second lug and the second portion second lug are aligned in response to the first ring portion being coupled to the second ring portion.

Any of the foregoing embodiments may also include a first actuator pathway ring defining a first opening and configured to be coupled to the first ring portion such that the first opening is aligned with the first portion first lug and the second portion first lug; and a second actuator pathway ring defining a second opening and configured to be coupled to the first ring portion such that the second opening is aligned with the first portion second lug and the second portion second lug.

In any of the foregoing embodiments, the aft cascade ring is configured for use in a nacelle having an axis, and the first actuator pathway ring and the second actuator pathway ring extend radially forward from the first ring portion.

In any of the foregoing embodiments, the first ring portion and the second ring portion include a composite material that includes a fiber and a thermoplastic.

In any of the foregoing embodiments, the aft cascade ring forms half of a total aft cascade ring such that each half is configured to extend from a hinge beam to a latch beam.

In any of the foregoing embodiments, the first ring portion has a first "L"-shaped cross-section, the second ring portion has a second "L"-shaped cross section, and the aft cascade ring has a "U"-shaped cross section in response to the first ring portion being coupled to the second ring portion.

In any of the foregoing embodiments, the first ring portion is coupled to the second ring portion via at least one of welding or bonding; and the first ring portion and the second ring portion are each formed using at least one of compression molding or stamping.

In any of the foregoing embodiments, the first ring portion and the second ring portion each include multiple plies, and a quantity of plies of the first ring portion becomes reduced towards the first portion first lug to provide a stepped ply drop design.

Also disclosed is an aft cascade ring. The aft cascade ring includes a first ring portion having a first arc shape and defining a first portion first lug. The aft cascade ring further includes a second ring portion having a second arc shape and defining a second portion first lug, the second ring portion being coupled to the first ring portion such that the first portion first lug and the second portion first lug are aligned. The aft cascade ring further includes a first actuator pathway ring defining a first opening and configured to be coupled to the first ring portion such that the first opening is aligned with the first portion first lug and the second portion first lug.

Any of the foregoing embodiments may also include a second actuator pathway ring defining a second opening and configured to be coupled to the first ring portion, wherein: the first ring portion further defines a first portion second lug; the second ring portion further defines a second portion second lug; and the first portion second lug, the second portion second lug, and the second opening are aligned in response to the first ring portion being coupled to the second ring portion and to the second actuator pathway ring.

In any of the foregoing embodiments, the aft cascade ring is configured for use in a nacelle having an axis, and the first actuator pathway ring and the second actuator pathway ring extend radially forward from the first ring portion.

In any of the foregoing embodiments, the first ring portion and the second ring portion include a composite material that includes a fiber and a thermoplastic; and the first ring portion and the second ring portion are each formed using at least one of compression molding or stamping.

In any of the foregoing embodiments, the aft cascade ring forms half of a total aft cascade ring such that each half is configured to extend from a hinge beam to a latch beam.

In any of the foregoing embodiments, the first ring portion has a first "L"-shaped cross-section, the second ring portion has a second "L"-shaped cross section, and the aft cascade ring has a "U"-shaped cross section in response to the first ring portion being coupled to the second ring portion.

In any of the foregoing embodiments, the first ring portion and the second ring portion each include multiple plies, and a quantity of plies of the first ring portion becomes reduced towards the first portion first lug to provide a stepped ply drop design.

Also disclosed is a method for forming an aft cascade ring. The method includes forming a first ring portion having a first arc shape and defining a first portion first lug. The method also includes forming a second ring portion having a second arc shape and defining a second portion first lug. The method also includes coupling the first ring portion to the second ring portion such that the first portion first lug aligns with the second portion first lug.

In any of the foregoing embodiments, forming the first ring portion further includes forming the first ring portion to define a first portion second lug; and forming the second ring portion further includes forming the second ring portion to define a second portion second lug.

Any of the foregoing embodiments may also include forming a first actuator pathway ring that defines a first opening; forming a second actuator pathway ring that defines a second opening; coupling the first actuator pathway ring to the first ring portion such that the first opening is aligned with the first portion first lug and the second portion first lug; and coupling the second actuator pathway ring to the first ring portion such that the second opening is aligned with the first portion second lug and the second portion second lug.

In any of the foregoing embodiments, forming the first ring portion includes forming the first ring portion to have a reduced quantity of plies towards the first portion first lug to provide a stepped ply drop design.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
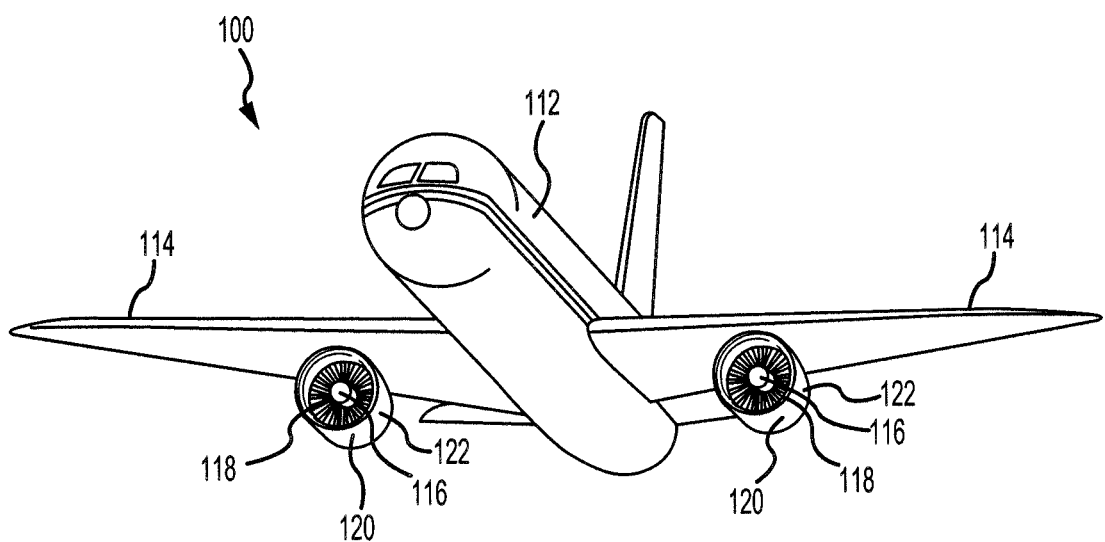
FIG. 1 illustrates a perspective view of an aircraft in accordance with various embodiments.

In various embodiments and with reference to FIG. 1, an aircraft 100 may comprise a fuselage 112 and a pair of wings 114. A propulsion system 120 (e.g., a turbofan gas turbine engine with a nacelle assembly) may be coupled to the aircraft 100 (e.g., mounted on the underside of a wing 114). The propulsion system 120 may be configured to provide at least one of forward thrust or propulsion for the aircraft 100.

In various embodiments, the propulsion system 120 may comprise an engine including a fan 118 and an engine core 116, housed within a nacelle assembly 122. The typical nacelle assembly, or more simply a nacelle assembly 122, may comprise an inlet, a fan cowl, a thrust reverser, and an exhaust system. The nacelle assembly 122 surrounds the engine core 116 providing smooth aerodynamic surfaces for airflow around and into the engine. The nacelle also helps define a bypass air duct through the propulsion system 120.

In various embodiments, the fan 118 may draw and direct a flow of air into and through the propulsion system 120. After the fan 118, the air is divided into two principal flow paths, one flow path through engine core 116 (i.e., a "core airflow"), and another flow path through a bypass air duct (i.e., a "bypass airflow"). The engine core flow path is directed into the engine core 116 and initially passes through a compressor that increases the air flow pressure, and then through a combustor where the air is mixed with fuel and ignited. The combustion of the fuel and air mixture causes a series of turbine blades at the rear of the engine core 116 to rotate, and to drive the engine's compressor and fan 118. The high-pressure exhaust gases from the combustion of the fuel and air mixture are thereafter directed through an exhaust system aft of the engine for thrust.

Figure 2:
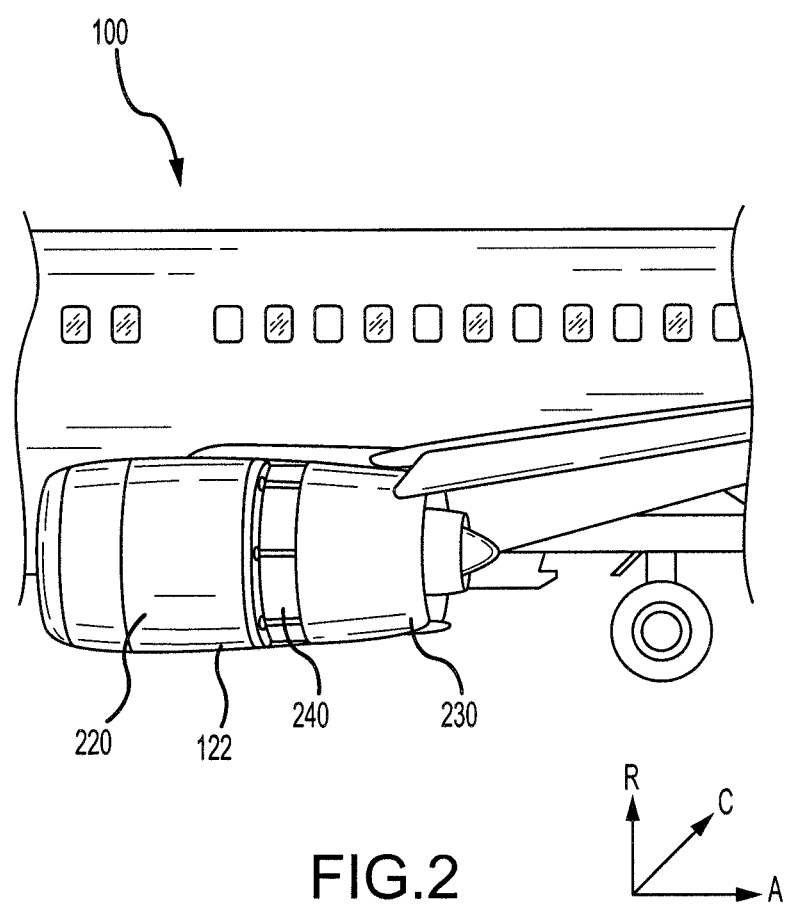
FIG. 2 illustrates a side view of the aircraft of FIG. 1 including a nacelle in accordance with various embodiments.

In various embodiments and with reference to FIG. 2, a thrust reverser system of the aircraft 100 may be included in the nacelle assembly 122 and may include a translating sleeve 230 and a cascade, or cascade array, 240. The thrust reverser system may also comprise an air diversion system that is configured to direct airflow in the bypass duct through the cascade to create reverse thrust. The air diversion system may be any suitable system including, for example, blocker doors, diversion doors, and/or the like. An A-R-C axis as shown throughout the drawings to illustrate the axial, radial, and circumferential directions, respectively.

Figure 3:
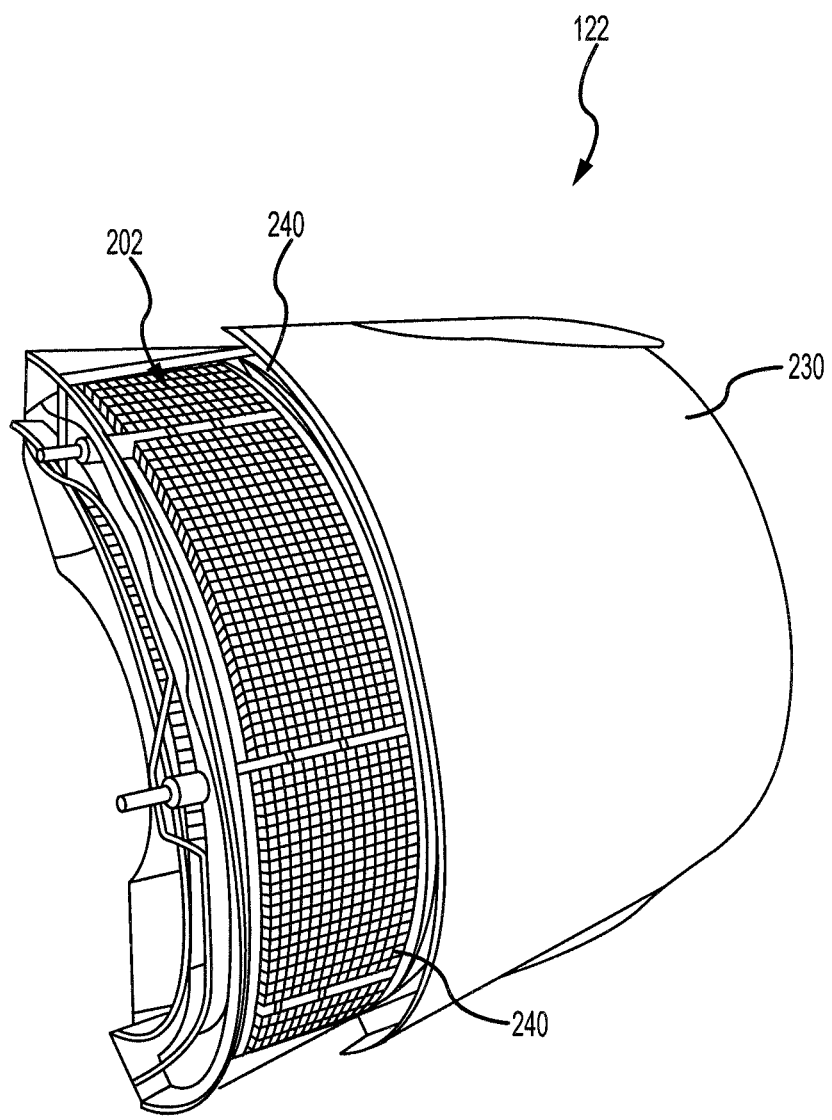
FIG. 3 illustrates a perspective view of a portion of the nacelle of FIG. 2 including a cascade array in accordance with various embodiments.

Referring to FIG. 3 and in operation, the translating sleeve 230 may translate and/or move aft, separating from a fan cowl 220 in response to an event (e.g., a landing, touch down, activation of the thrust reverser system manually or automatically, or the like). This aft movement of the translating sleeve 230 may expose the cascade 240 to allow air to be diverted through the cascade 240 and directed forward to create reverse thrust. As is known in this art, in the stowed position of the thrust reverser, the cascade 240 may be housed between an inner and an outer panel of the translating sleeve 230 which define a generally annular-shaped pocket therebetween.

Figure 4:
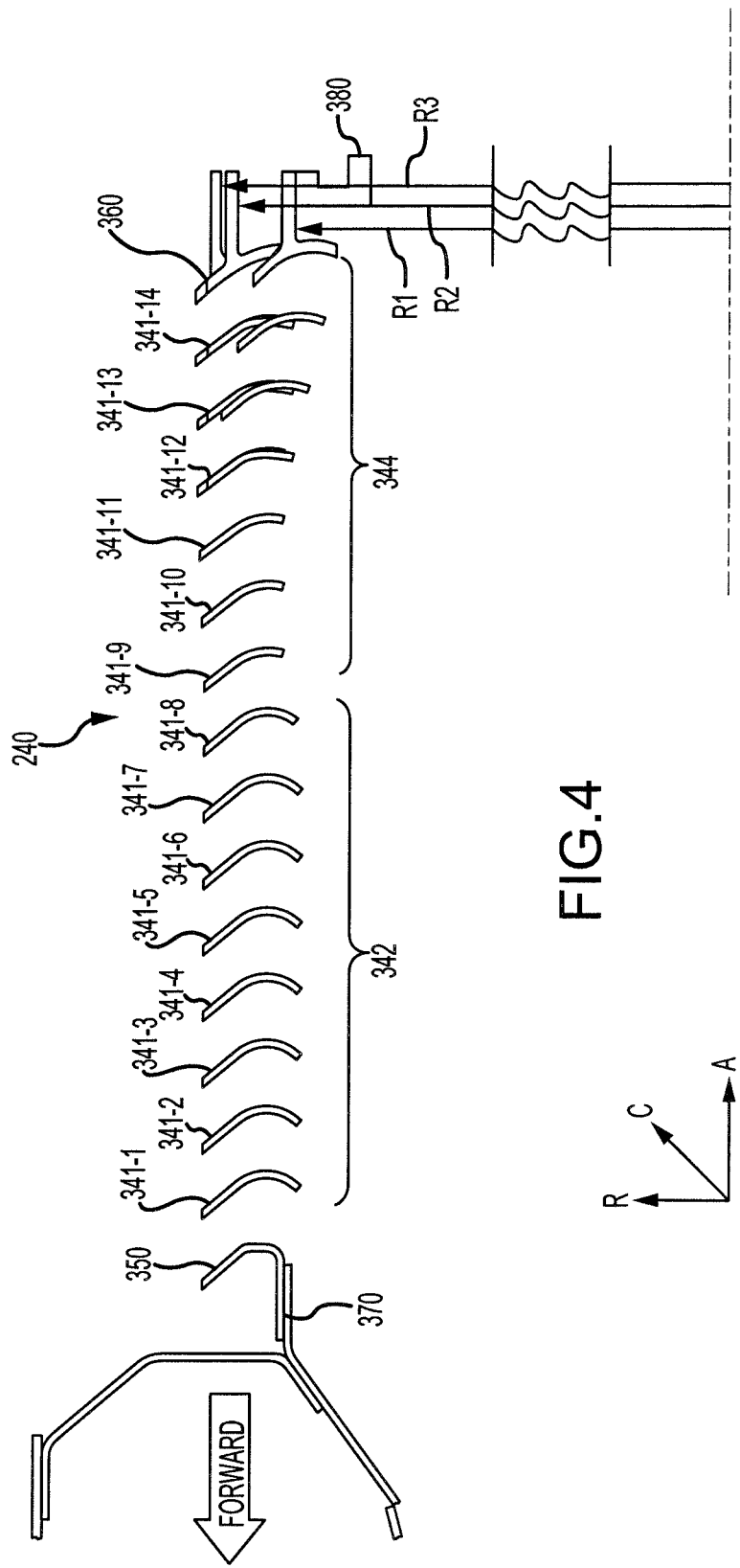
FIG. 4 illustrates a cross sectional view of the cascade array of FIG. 3 in accordance with various embodiments.

In various embodiments and with reference to FIG. 4, the cascade 240 may include a forward attachment 350 and an aft attachment 360. The cascade 240 may also include a plurality of cascade vanes 341 (shown as vane 341-1 (a forward vane or row of vanes 341-1), vane 341-2, vane 341-3, vane 341-4, vane 341-5, vane 341-6, vane 341-7, vane 341-8, vane 341-9, vane 341-10, vane 341-11, vane 341-12, vane 341-13, and vane 341-14 (an aft vane or row of vanes 341-14)). The plurality of vanes 341 may be distributed between a forward attachment 350 and an aft attachment 360.

In various embodiments, the forward attachment 350 may couple to and/or attach to a torque box 370. The forward attachment 350 may be coupled to the torque box 370 in any suitable fashion, including, for example, with fasteners (e.g., bolts, screws, and/or the like). The aft attachment 360 may be coupled to an aft cascade ring 380. The aft cascade ring 380 may include any suitable full or partial hoop structure configured to support the aft portion of the cascade 240 and attach to the aft attachment 360. Moreover, the aft attachment 360 may couple to the aft cascade ring 380 in any suitable fashion, including, for example, by a fastener (e.g., a nut and bolt, a screw, and/or the like).

In various embodiments and with reference to FIGS. 3 and 4, the cascade 240 may include a first vane set, or plurality of vanes, 342 near a forward portion of the cascade 240 and a second vane set, or plurality of vanes, 344 near an aft portion of the cascade 240. Each of the vanes 342, 344 may be coupled between two strongbacks of a plurality of strongbacks 202. Where used in this context, a strongback refers to a support member for supporting vanes and may include a beam, a bar, a shaft, a post, or the like.

In various embodiments, the strongbacks 202 may extend the entire length of the cascade 240 or may only extend for a portion of the length of the cascade 240. The illustration in FIG. 4 represents a composite of several diagrammatical sectional views of the cascade 240 taken at different circumferential positions. For example, the radial sectional views may be shown at about the two o'clock position, about the four o'clock position overlaid on the first view, and about the five o'clock position overlaid on the first and second views. This overlay of views illustrates the change in geometry of the cascade 240 between different circumferential positions. The forward attachment 350 may have a constant radius at all circumferential locations, in other words it may not vary and it may maintain a set radial distance from an engine centerline or nacelle centerline at generally all circumferential locations. Likewise, the first vane set 342 may include a constant radius at all circumferential positions. However, the radius of the aft attachment 360 at the aft cascade ring may vary according to the circumferential position of cascade 240. For example, at a first circumferential position, the aft attachment may couple to the aft cascade ring 380 at a first radius R1 from the engine centerline or the nacelle centerline. At a second circumferential position, the aft attachment 360 may couple to the aft cascade ring 380 at a second radius R2. At a third circumferential position, the aft attachment 360 may couple to the aft cascade ring 380 at a third radius R3. The second vane set 344 creates a transition between the constant radius vanes in the first vane set 342 and the variable radius aft attachment 360.

The varying radius of the aft attachment 360 allows the cascade 240 to fit into a confined, non-cylindrical space in the thrust reverser. If the generally annularly-shaped pocket between the inner and outer panel of the translating sleeve is not perfectly annular, but instead moves radially in and out depending upon the station (i.e. the axial position relative to the centerline) and the circumferential position, the varying radius of the aft attachment 360 allows the cascade 240 to fit in such a space. Meanwhile, the constant radius of the forward attachment 350 facilitates design and manufacture of a simpler and reliable interface between the cascade 240 and the torque box 370. However, in various embodiments, the aft attachment 360 may have a constant radius and, in various embodiments, the forward attachment 350 may have a varying radius.

Figure 5:
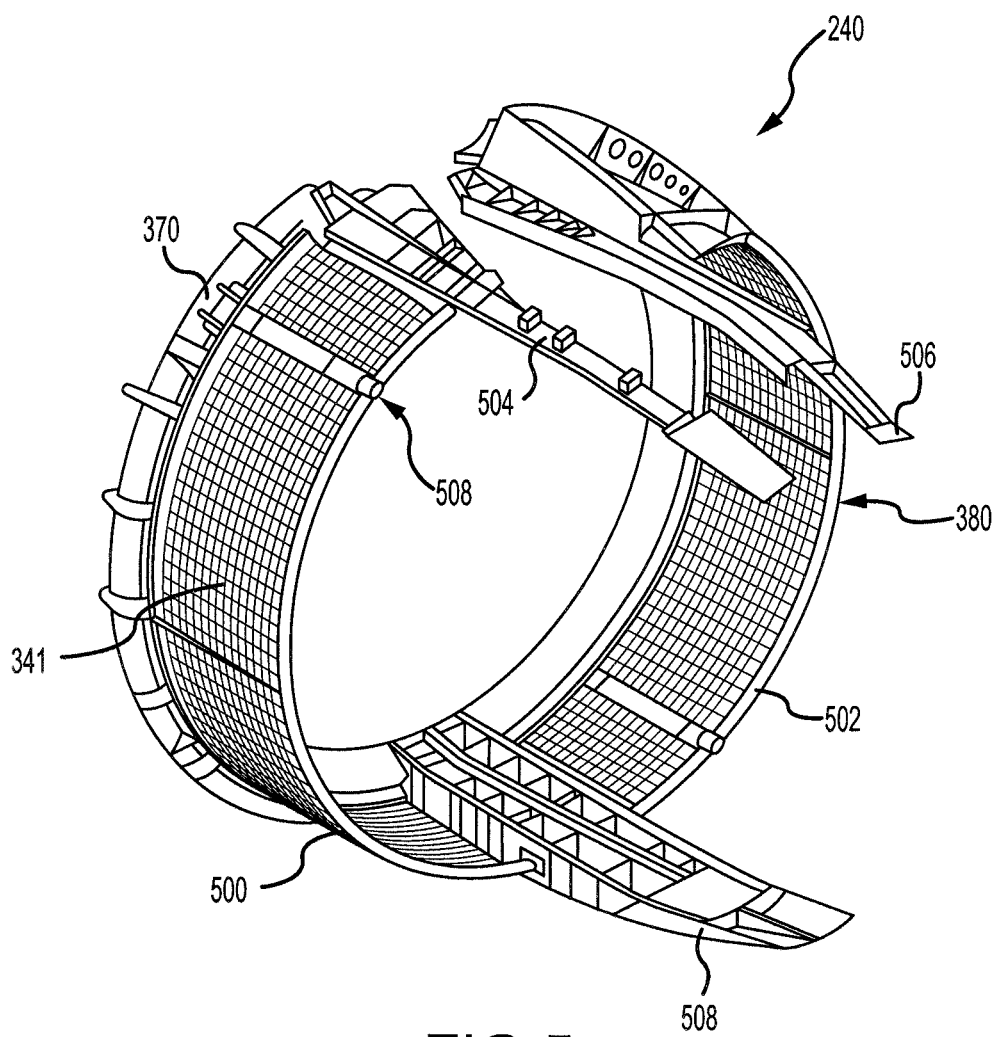
FIG. 5 illustrates the cascade array of FIG. 3 in accordance with various embodiments.
Figure 5:
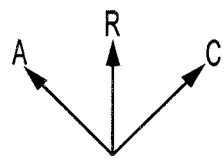

Turning now to FIG. 5, the cascade array 240 is shown separate from a nacelle. The cascade array 240 includes the torque box 370, the aft cascade ring 380, and the plurality of vanes 341. The cascade array 240 further includes a first hinge beam 504 and a second hinge beam 506 that each extend aft from the vanes 341. The cascade array 240 further includes a latch beam 510 that likewise extends aft from the vanes 341.

The aft cascade ring 380 may include a first aft cascade ring 500 and a second aft cascade ring 502. The first aft cascade ring 500 extends from the first hinge beam 504 to the latch beam 510 and has an arc shape. The second aft cascade ring 502 extends from the second hinge beam 506 to the latch beam 510 and likewise has an arc shape. Together, the first aft cascade ring 500 and the second aft cascade ring 502 form an entire aft cascade ring 380. The aft cascade ring 380 defines a plurality of actuator pathways 508. Actuators may extend through each of the plurality of actuator pathways 508 and may be coupled to, and actuate forward and aft, the translating sleeve 230 of FIG. 2.

Figure 6:
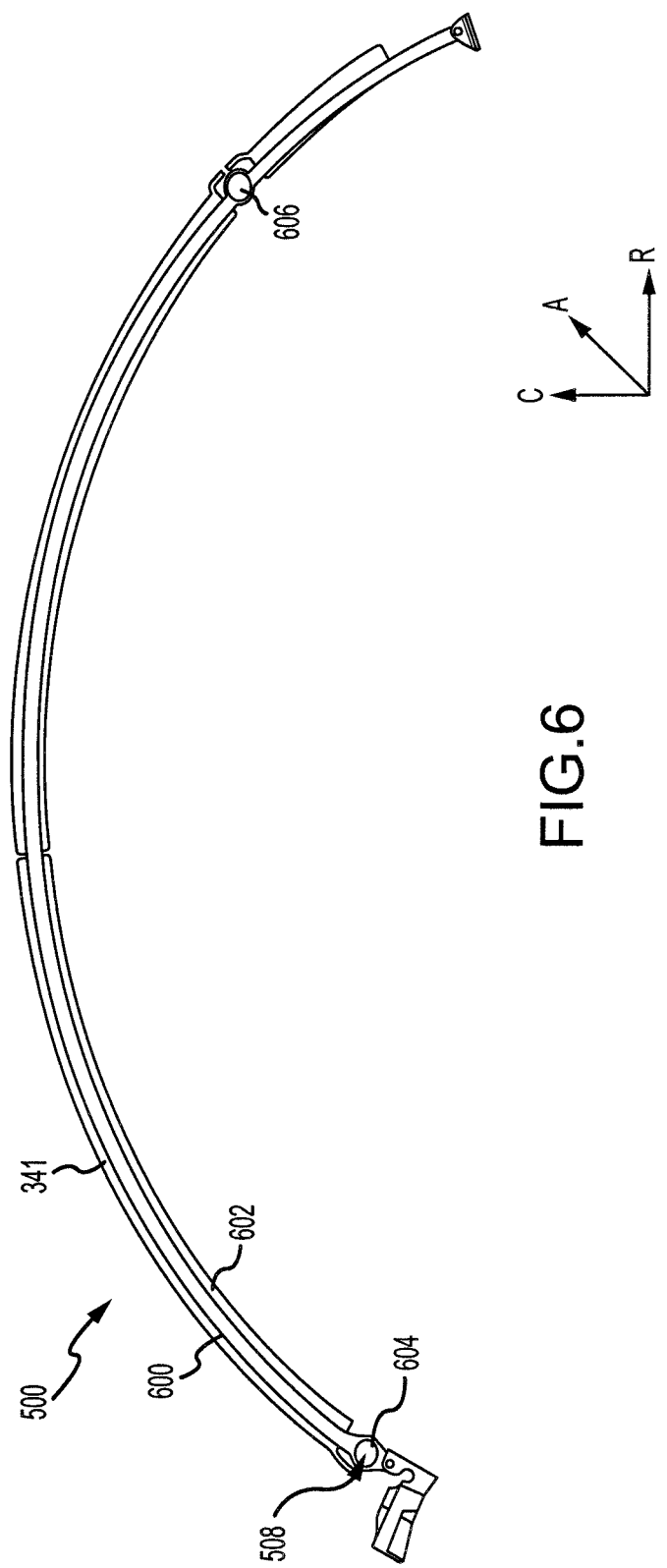
FIG. 6 illustrates an aft cascade ring for use with the cascade array of FIG. 3 in accordance with various embodiments.

Turning now to FIG. 6, the first aft cascade ring, or aft cascade ring, 500 includes a first, or top, ring portion 600 and a second, or bottom, ring portion 602. The first aft cascade ring 500 may define multiple actuator pathways 508 including a first actuator pathway 604 and a second actuator pathway 606.

Figure 7:
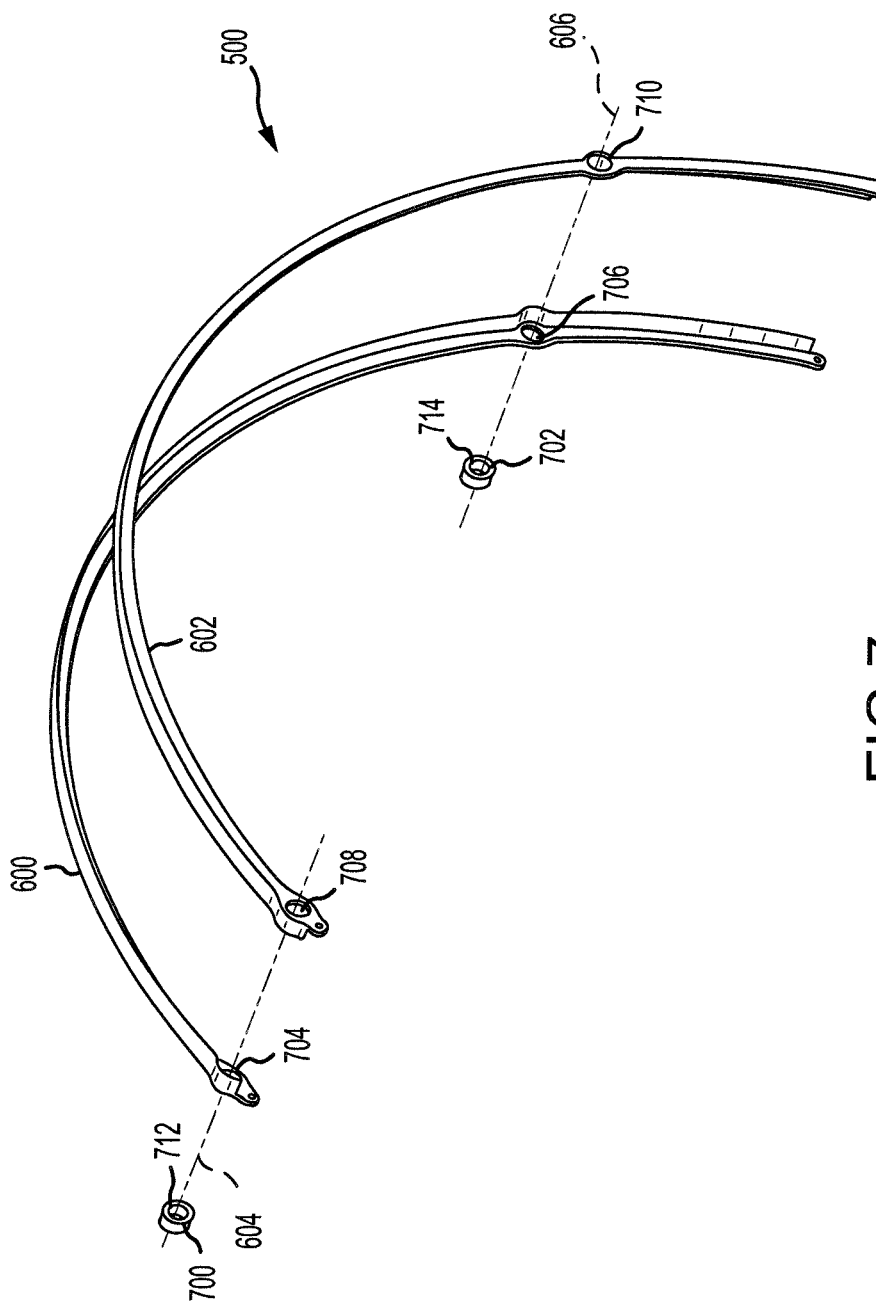
FIG. 7 illustrates an exploded view of the aft cascade ring of FIG. 6 in accordance with various embodiments.

Referring to FIG. 7, an exploded view of the first aft cascade ring 500 illustrates the various components of the first aft cascade ring 500. In particular, the aft cascade ring 500 includes the first ring portion 600 and the second ring portion 602. The aft cascade ring 500 further includes a first actuator pathway ring 700 and a second actuator pathway ring 702.

The first ring portion 600 may define a first portion first lug 704 and a first portion second lug 706. The second ring portion 602 may define a second portion first lug 708 and a second portion second lug 710. The first actuator pathway ring 700 may define a first opening 712, and the second actuator pathway ring 702 may define a second opening 714. In response to the components of the first aft cascade ring 500 being coupled together, the first actuator pathway 604 is defined through the first opening 712, the first portion first lug 704, and the second portion first lug 708. Likewise, and in response to the components of the first aft cascade ring 500 being coupled together, the second actuator pathway 606 is defined through the second opening 714, the first portion second lug 706, and the second portion second lug 710.

In various embodiments, the first ring portion 600 may be located radially inward from the second ring portion 602.

The first ring portion 600 and the second ring portion 602 may include a composite material. For example, the composite material may include a fiber, such as a long or short carbon or glass fiber, aramid fiber, or the like, along with a thermoset or thermoplastic material, such as a resin. The first ring portion 600 and the second ring portion 602 may be formed using any known technique such as stamping, continuous compression molding (CCM), or the like.

The first actuator pathway ring 700 and the second actuator pathway ring 702 may include a composite material. For example, the composite material may include a fiber, such as a long or short carbon or glass fiber, chopped fiber, aramid fiber, or the like, along with a thermoset or thermoplastic material, such as a resin.

In order to form the first aft cascade ring 500, the first ring portion 600 and the second ring portion 602 may be aligned such that the first portion first lug 704 is aligned with the second portion first lug 708, and the first portion second lug 706 is aligned with the second portion second lug 710. The first ring portion 600 may then be coupled to the second ring portion 602 using any known technique. For example, the first ring portion 600 may be coupled to the second ring portion 602 using a welding technique, using an adhesive, or the like.

The first actuator pathway ring 700 may then be aligned with the first portion first lug 704 and then coupled to the first ring portion 600 using any known technique such as welding, use of an adhesive, or the like. The second actuator pathway ring 702 may be aligned with first portion second lug 706 and then coupled to the first ring portion 600 using any known technique such as welding, use of an adhesive, or the like.

Figure 8:
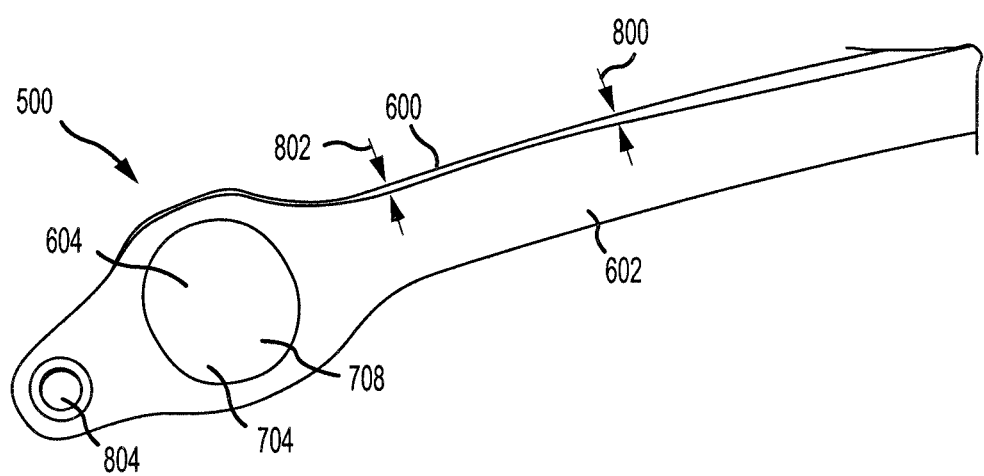
FIG. 8 illustrates an enlarged view of a portion of the aft cascade ring of FIG. 6 in accordance with various embodiments.

Turning to FIG. 8, an enlarged view of a portion of the first aft cascade ring 500 is shown. As shown, the first ring portion 600 and the second ring portion 602 define the first lug portions 704, 708. As further shown, the first ring portion 600 may be located radially outward from the second ring portion 602. Additionally, at least one of the first ring portion 600 or the second ring portion 602 may define a fastener aperture 804 designed to receive a fastener for fastening the first aft cascade ring to a component of the nacelle assembly 122 of FIG. 2.

The first ring portion 600 may have a first thickness 800 and may have a second thickness 802 at a location closer to the first actuator pathway 604 than the location of the first thickness 800. In that regard, the first ring portion 600 may be formed by stacking multiple plies of the composite material together. As the first ring portion 600 approaches the first actuator pathway 604, the quantity of plies of the first ring portion 600 may be reduced, thus providing a stepped ply drop design. Such a stepped ply drop design provides relatively high quality bonding, increased load distribution due to additional surface area between plies, and the like.

Figure 9A:
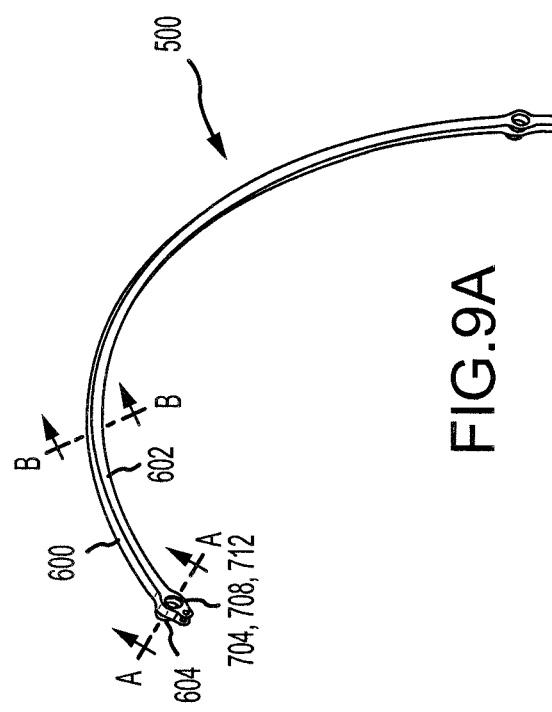
FIG. 9A illustrates a perspective view of the aft cascade ring of FIG. 6 in accordance with various embodiments.
Figure 9C:
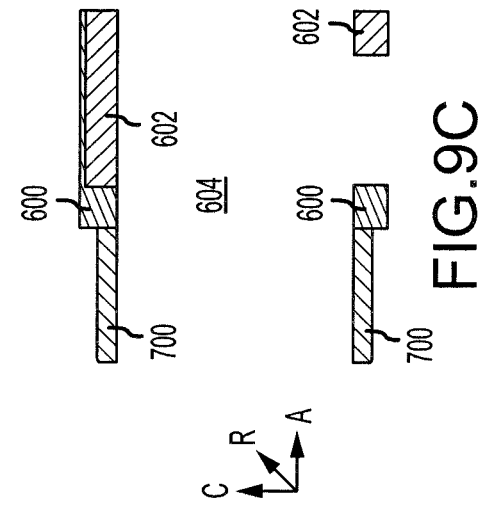
FIG. 9C illustrates a cross-sectional view of a portion of the aft cascade ring of FIG. 6 including a first actuator pathway in accordance with various embodiments.
Figure 9B:
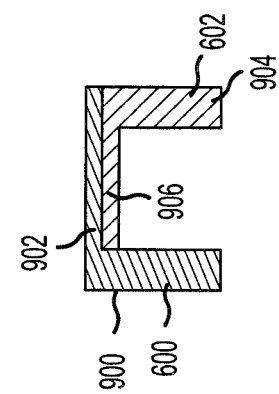
FIG. 9B illustrates a cross-sectional view of a center portion of the aft cascade ring of FIG. 6 in accordance with various embodiments.

Turning now to FIGS. 9A, 9B, and 9C, various cross-sectional views of the first aft cascade ring 500 are shown. As shown, the first ring portion 600 and the second ring portion 602 each have a shape that resembles a "L." In response to the first ring portion 600 being coupled to the second ring portion 602, the first aft cascade ring 500 may have a cross-sectional shape that resembles a "U," as best seen in FIG. 9B.

As can further best be seen in FIG. 9B, the second ring portion 602 is located beneath the first ring portion 600. In particular, the first ring portion 600 includes a main portion 900 and a mating portion 902 that extends perpendicular to the main portion 900. The second ring portion 602 includes a main portion 904 and a mating portion 906 that extends perpendicular to the main portion 904. The mating portion 902 may be placed adjacent to the mating portion 906 and the two may be coupled together. For example, the mating portion 902 may be coupled to the mating portion 906 via welding, use of an adhesive, or the like.

As shown in FIG. 9C, the first actuator pathway ring 700 extends axially forward from the first ring portion 600. In that regard, the first actuator pathway ring 700 may be coupled to a forward face of the first ring portion 600.

Figure 10:
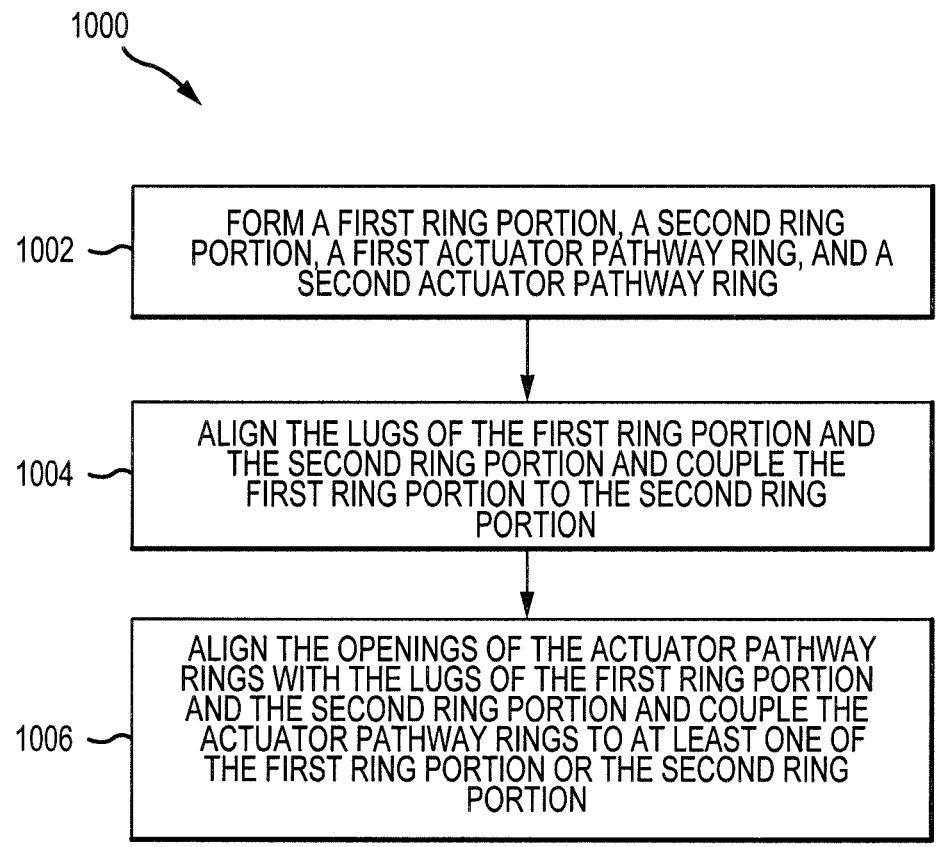
FIG. 10 illustrates a method for forming an aft cascade ring in accordance with various embodiments.

Turning now to FIG. 10, a method 1000 for forming an aft cascade ring is shown.

In block 1002, various components of the aft cascade ring may be formed. These components may include a first ring portion, a second ring portion, a first actuator pathway ring, and a second actuator pathway ring. These components may be formed using any known method such as compression molding, stamping, additive manufacturing, or the like. In various embodiments, these components may include any one or more composite material that includes chopped, short, or long fibers along with a resin, such as a thermoplastic or thermoset resin.

In block 1004, the lugs of the first portion and the second portion may be aligned with each other. In response to such alignment, the first ring portion and the second ring portion may be coupled together using any known technique such as welding, use of an adhesive, or the like.

In block 1006, the openings of the actuator pathway rings may be aligned with the lugs of the first ring portion and the second ring portion. In response to the openings being aligned with the lugs, the actuator pathway rings may be coupled to at least one of the first ring portion or the second ring portion. For example, the actuator pathway rings may be coupled to a forward facing surface of the first ring portion using any known technique such as welding, use of an adhesive, or the like.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An aft cascade ring, comprising:
   a first ring portion having a first arc shape and defining a first portion first lug;
   a second ring portion having a second arc shape and defining a second portion first lug, the second ring portion being coupled to the first ring portion such that the first portion first lug and the second portion first lug are aligned; and
   a first actuator pathway ring defining a first opening and configured to be coupled to the first ring portion such that the first opening is aligned with the first portion first lug and the second portion first lug,
   wherein the first portion first lug, the second portion first lug, and the first opening define a first actuator pathway configured to receive a portion of a first actuator, and
   wherein the first ring portion has a first L-shaped cross-section, the second ring portion has a second L-shaped cross section, and the aft cascade ring has a U-shaped cross section in response to the first ring portion being coupled to the second ring portion.

2. The aft cascade ring of claim 1, wherein:
   the first ring portion further defines a first portion second lug;
   the second ring portion further defines a second portion second lug; and
   the first portion second lug and the second portion second lug are aligned in response to the first ring portion being coupled to the second ring portion.

3. The aft cascade ring of claim 2, further comprising:
   a second actuator pathway ring defining a second opening and configured to be coupled to the first ring portion such that the second opening is aligned with the first portion second lug and the second portion second lug,
   wherein the first portion second lug, the second portion second lug, and the second opening define a second actuator pathway configured to receive a portion of a second actuator.

4. The aft cascade ring of claim 3, wherein the aft cascade ring is configured for use in a nacelle having an axis, and the first actuator pathway ring and the second actuator pathway ring extend radially forward from the first ring portion.

5. The aft cascade ring of claim 1, wherein the first ring portion and the second ring portion include a composite material that includes a fiber and a thermoplastic.

6. The aft cascade ring of claim 1, wherein the aft cascade ring forms half of a total aft cascade ring such that each half is configured to extend from a hinge beam to a latch beam.

7. The aft cascade ring of claim 1, wherein:
   the first ring portion is coupled to the second ring portion via at least one of welding or bonding; and
   the first ring portion and the second ring portion are each formed using at least one of compression molding or stamping.

8. The aft cascade ring of claim 1, wherein the first ring portion and the second ring portion each include multiple plies, and a quantity of plies of the first ring portion become reduced towards the first portion first lug to provide a stepped ply drop design.

9. An aft cascade ring, comprising:
   a first ring portion having a first arc shape and defining a first portion first lug and a first portion second lug;
   a second ring portion having a second arc shape and defining a second portion first lug and a second portion second lug, the second ring portion being coupled to the first ring portion such that the first portion first lug and the second portion first lug are aligned;
   a first actuator pathway ring defining a first opening and configured to be coupled to the first ring portion such that the first opening is aligned with the first portion first lug and the second portion first lug; and
   a second actuator pathway ring defining a second opening and configured to be coupled to the first ring portion such that the second opening is aligned with the first portion second lug and the second portion second lug,
   wherein:
   the first portion first lug, the second portion first lug, and the first opening define a first actuator pathway configured to receive a portion of a first actuator,
   the first portion second lug, the second portion second lug, and the second opening are aligned in response to the first ring portion being coupled to the second ring portion and to the second actuator pathway ring,
   the first portion second lug, the second portion second lug, and the second opening define a second actuator pathway configured to receive a portion of a second actuator, and
   the first ring portion has a first L-shaped cross-section, the second ring portion has a second L-shaped cross section, and the aft cascade ring has a U-shaped cross section in response to the first ring portion being coupled to the second ring portion.

10. The aft cascade ring of claim 9, wherein the aft cascade ring is configured for use in a nacelle having an axis, and the first actuator pathway ring and the second actuator pathway ring extend radially forward from the first ring portion.

11. The aft cascade ring of claim 9, wherein:
    the first ring portion and the second ring portion include a composite material that includes a fiber and a thermoplastic; and
    the first ring portion and the second ring portion are each formed using at least one of compression molding or stamping.

12. The aft cascade ring of claim 9, wherein the aft cascade ring forms half of a total aft cascade ring such that each half is configured to extend from a hinge beam to a latch beam.

13. The aft cascade ring of claim 9, wherein the first ring portion and the second ring portion each include multiple plies, and a quantity of plies of the first ring portion become reduced towards the first portion first lug to provide a stepped ply drop design.

14. A method for forming an aft cascade ring, comprising:
forming a first ring portion having a first arc shape and a first L-shaped cross-section and defining a first portion first lug;
forming a second ring portion having a second arc shape and a second L-shaped cross-section and defining a second portion first lug;
forming or procuring a first actuator pathway ring defining a first opening; and
coupling the first ring portion to the second ring portion and to the first actuator pathway ring such that the first portion first lug aligns with the second portion first lug and the first opening such that the first portion first lug, the second portion first lug, and the first opening define a first actuator pathway configured to receive a portion of a first actuator, and such that the aft cascade ring has a U-shaped cross section in response to the first ring portion being coupled to the second ring portion.

15. The method of claim 14, wherein:
forming the first ring portion further includes forming the first ring portion to define a first portion second lug; and
forming the second ring portion further includes forming the second ring portion to define a second portion second lug.

16. The method of claim 15, further comprising:
forming a second actuator pathway ring that defines a second opening; and
coupling the second actuator pathway ring to the first ring portion such that the second opening is aligned with the first portion second lug and the second portion second lug such that the first portion second lug, the second portion second lug, and the second opening define a second actuator pathway configured to receive a portion of a second actuator.

17. The method of claim 14, wherein forming the first ring portion includes forming the first ring portion to have a reduced quantity of plies towards the first portion first lug to provide a stepped ply drop design.

* * * * *